(12) United States Patent
Gretz

(10) Patent No.: US 7,304,251 B1
(45) Date of Patent: Dec. 4, 2007

(54) ELECTRICAL FITTING FOR SNAP IN CONNECTION OF CABLES

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 11/591,199

(22) Filed: Nov. 1, 2006

Related U.S. Application Data

(63) Continuation-in-part of application No. 11/521,957, filed on Sep. 15, 2006, now Pat. No. 7,226,309, and a continuation-in-part of application No. 11/494,665, filed on Jul. 27, 2006, now Pat. No. 7,154,054, and a continuation-in-part of application No. 11/494,663, filed on Jul. 27, 2006, now Pat. No. 7,161,095, and a continuation-in-part of application No. 11/300,859, filed on Dec. 15, 2005, now Pat. No. 7,238,894.

(51) Int. Cl.
*H02G 3/18* (2006.01)

(52) U.S. Cl. .................. 174/655; 174/653; 174/659; 174/668; 439/552; 248/56; 285/194

(58) Field of Classification Search .............. 174/655, 174/653, 659, 668, 135, 152 G, 153 G, 151, 174/59–61; 439/552, 557; 16/2.1; 248/56; 285/194.921
See application file for complete search history.

(56) References Cited

U.S. PATENT DOCUMENTS

| 2,540,999 | A | | 2/1951 | Thomas, Jr. | |
|---|---|---|---|---|---|
| 2,639,927 | A | | 5/1953 | Billeter | |
| 2,973,212 | A | | 2/1961 | Rose | |
| 4,490,576 | A | * | 12/1984 | Bolante et al. | 174/655 |
| 4,739,126 | A | * | 4/1988 | Gutter et al. | 174/78 |
| 5,072,072 | A | * | 12/1991 | Bawa et al. | 174/655 |
| 5,132,493 | A | * | 7/1992 | Sheehan | 174/655 |
| 5,321,205 | A | * | 6/1994 | Bawa et al. | 174/655 |
| 5,528,712 | A | | 6/1996 | Belenkiy et al. | |
| 6,355,884 | B1 | | 3/2002 | Gretz | |
| 6,521,831 | B1 | | 2/2003 | Gretz | |
| 7,057,107 | B2 | | 6/2006 | Auray et al. | |
| 7,075,007 | B2 | | 7/2006 | Auray et al. | |

* cited by examiner

*Primary Examiner*—Dhiru R. Patel

(57) ABSTRACT

A duplex electrical fitting having angled cable insertion bores that direct the cables to a leading outlet. The duplex electrical fitting includes a connector body, an internal snap ring holder, and snap rings secured to the snap ring holder. The angled bores are axially aligned with the leading outlet of the electrical fitting. Electrical cables inserted within the angled bores are directed to the leading outlet of the fitting. The inserted electrical cables are held within the fitting by the snap rings. The angled cable insertion bores enable easier insertion of electrical cables through the electrical fitting.

19 Claims, 11 Drawing Sheets

ELECTRICAL FITTING FOR SNAP IN CONNECTION OF CABLES

This application is a Continuation-In-Part of U.S. patent application Ser. No. 11/521,957 filed Sep. 15, 2006 now U.S. Pat. No. 7,226,309, and is a Continuation-In-Part of U.S. patent application Ser. No. 11/494,665 filed Jul. 27, 2006 now U.S. Pat. No. 7,154,054, and is a Continuation-In-Part of U.S. patent application Ser. No. 11/494,663 filed Jul. 27, 2006 now U.S. Pat. No. 7,161,095, both of which are Continuation-In-Parts of U.S. patent application Ser. No. 11/300,859 filed Dec. 15, 2005 now U.S. Pat. No. 7,238,894.

FIELD OF THE INVENTION

This invention relates to fittings for connecting electrical cables to a panel or an electrical box and specifically to a duplex electrical fitting having an improved arrangement on the trailing end for insertion of electrical cables.

BACKGROUND OF THE INVENTION

Several prior art duplex electrical fittings have been proposed for the attachment of electrical cables to panels or electrical boxes. The duplex fittings typically include two cable insertion bores on the trailing end for accepting electrical cables and a single bore on the leading end through which the electrical cables extend into the panel or electrical box. Typically the cable insertion bores of the prior art fittings are parallel with one another. Although the prior art fittings accept electrical cables, as a result of the parallel orientation of the inserted cables and the single outlet bore at the leading end, there is limited space available at the leading end of the fitting for the exiting electrical cables. As a result of the parallel cable insertion bores and the single cable outlet at the leading end, the inserted electrical cables tend to crash into the necked down shoulder area surrounding the leading outlet thus making it very difficult to insert cables through the prior art duplex fittings. The inability to easily push electrical cables through the prior art fittings is a serious problem as installers typically pry on the inserted cables with tools, such as a screwdriver, from the leading outlet in an attempt to move the cables toward the leading end. The resultant prying on the electrical cables is a big disadvantage of prior art duplex electrical fittings as it can lead to damage of the electrical cables, of the wiring within the cables, or of the wiring insulation.

Electrical fittings having an improved arrangement on the trailing end for the attachment of electrical cables were disclosed in co-pending U.S. application Ser. Nos. 11/521, 957, 11/300,859, 11/494,663, and 11/494,665, all of which are commonly owned by the assignee of the present invention and the contents of which are incorporated herein in their entirety by reference thereto. The improved arrangement included single or tandem cable gripping tangs that were fastened externally to the tubular body of the electrical fittings.

The present invention provides a duplex electrical fitting that overcomes the problems with prior art fittings with parallel cable insertion bores. The duplex electrical fitting of the present invention provides angled cable insertion bores. The angled insertion bores direct the inserted electrical cables to the leading outlet of the fitting. As a result of the angled bores, each of the inserted cables is aligned directly with the leading outlet, making cable insertion much easier than in prior art duplex fittings. As a result of the improved path provided by the fitting of the present invention, there is no need to manipulate the inserted cables with tools to lead them through the fitting. The duplex electrical connector of the present invention thereby enables easier insertion of electrical cables through the electrical fitting.

SUMMARY OF THE INVENTION

The invention is a duplex electrical fitting having angled cable insertion bores that direct the cables to a leading outlet. The duplex electrical fitting includes a connector body, an internal snap ring holder, and snap rings secured to the snap ring holder. The angled bores are axially aligned with the leading outlet of the electrical fitting. Electrical cables inserted within the angled bores are directed to the leading outlet of the fitting. The inserted electrical cables are held within the fitting by the snap rings. The angled cable insertion bores enable easier insertion of electrical cables through the electrical fitting.

OBJECTS AND ADVANTAGES

Several advantages are achieved with the electrical fitting of the present invention, including:

(1) The electrical fitting will accommodate cables of multiple trade sizes. This enables a few sizes of fittings to accommodate the entire range of standard cable sizes available and therefore reduces stocking requirements of the fittings.
(2) The electrical fitting includes non-parallel cable insertion bores that direct inserted electrical cables to the leading outlet of the fitting.
(3) Cable insertion through the fitting is much easier than in prior art duplex fittings as a result of the angled bores.
(4) As a result of the improved path provided by the fitting of the present invention, there is no need to manipulate the inserted cables with tools to lead them through the fitting.

These and other objects and advantages of the present invention will be better understood by reading the following description along with reference to the drawings.

Figure 1:
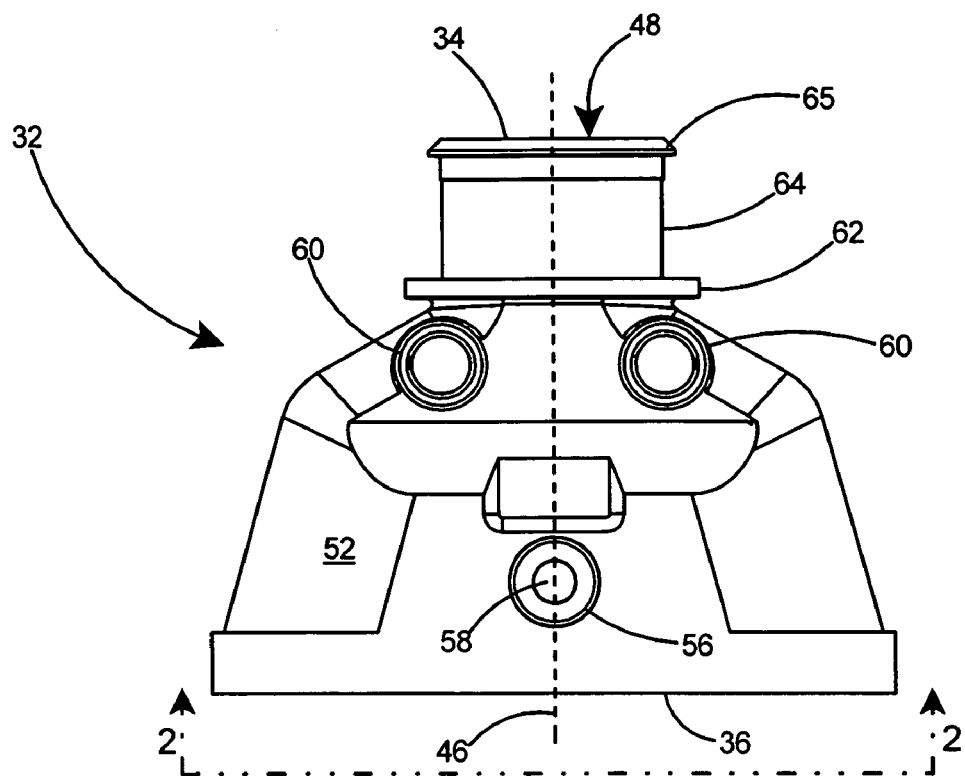
FIG. 1 is a top view of a connector body that forms a portion of the duplex electrical fitting of the present invention.

INDEX TO REFERENCE NUMERALS IN DRAWINGS 30 duplex electrical fitting
32 connector body
34 leading end of connector body
36 trailing end of connector body
38 trailing opening of connector body
40 snap ring holder
42 non-parallel bores
42A first bore
42B second bore
44 snap ring
44A first snap ring
44B second snap ring
46 center axis of connector body
48 leading opening of connector body
50 trailing opening of connector body
52 top surface of connector body
54 bottom surface of connector body
56 boss
58 threaded bore
60 view port
62 intermediate flange
64 nose portion
65 leading flange
66 electrical panel
67 threaded nose portion
68 locknut
69 leading end of snap ring holder
70 trailing end of snap ring holder
72 center axis of snap ring holder
74 top surface of snap ring holder
76 bottom surface of snap ring holder
77 depression
78 central axis of first bore
80 central axis of second bore
82 peripheral walls
84 opening in peripheral wall
86 side of snap ring holder
87 opening in blank
88 flat blank
90 straight slot
92 U-shaped slot
94 tab
96 first end of blank
98 groove
100 second end of blank
102 bend line
103 slit line
104 leading edge of blank or snap ring
105 trailing edge of blank or snap ring
106 inward tang
106A opposing inward tangs
106B pusher tang
108 outward-directed tang
110 angled free end
112 straight free end
114 sidewall of snap ring
116 end portion of inward tang
118 attachment arrangement for securing snap ring in holder
120 gap in split ring
122 attachment arrangement for securing the holder to the connector
124 fastener
125 wire lead
126 electrical cable
127 inner shoulder
128 duplex electrical fitting with threaded nose portion
129 leading end snap ring
130 lower inner quadrant
132 upper inner quadrant
134 knockout hole
θ angle of non-parallel bore with respect to center axis of fitting
$θ_1$ angle of inward tang with respect to sidewall of snap ring
$θ_2$ angle of end portion of inward tang with respect to inward tang

DETAILED DESCRIPTION OF THE INVENTION

Figure 9:
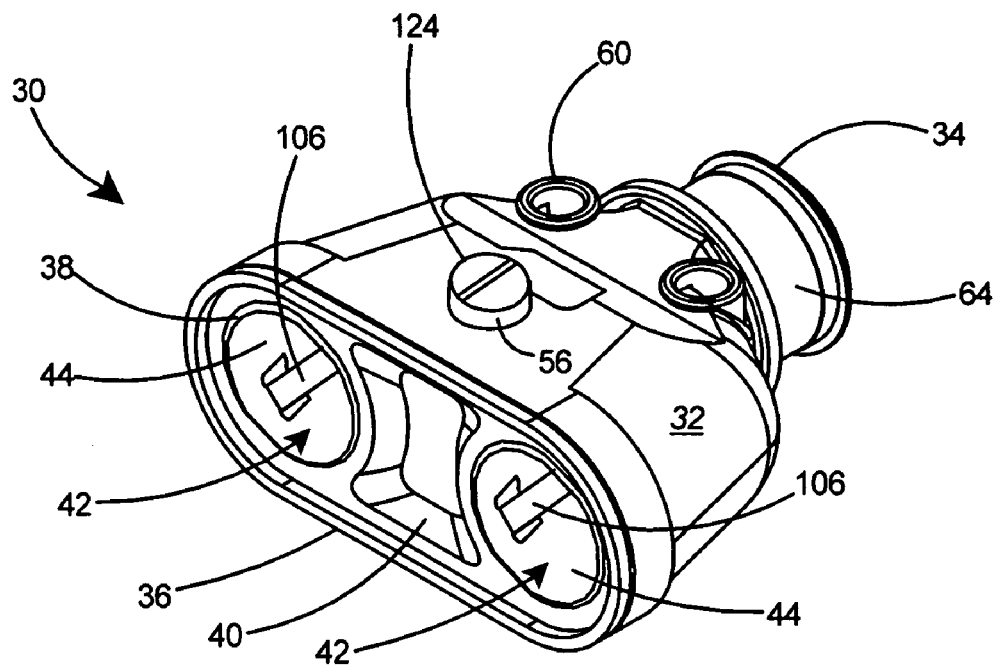
FIG. 9 is a perspective view of a duplex electrical fitting according to the present invention.
Figure 10:
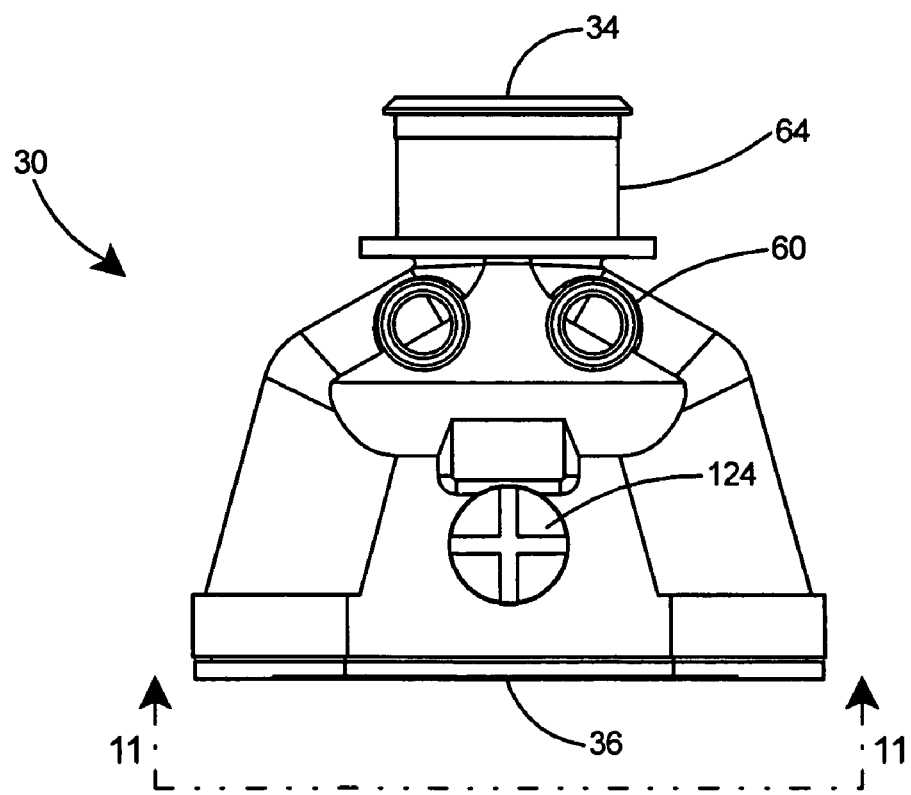
FIG. 10 is a top view of the duplex electrical fitting of FIG. 9.

With reference to FIG. 9 there is shown a preferred embodiment of a duplex electrical fitting 30 according to the present invention. The duplex electrical fitting 30 is an assembly including a connector body 32 having a leading end 34, a trailing end 36, and a trailing opening 38. A snap ring holder 40 having two non-parallel bores 42 is secured in the trailing opening 38 of the connector body 32. The duplex fitting 30 further includes a snap ring 44 secured in each of the bores 42.

Figure 2:
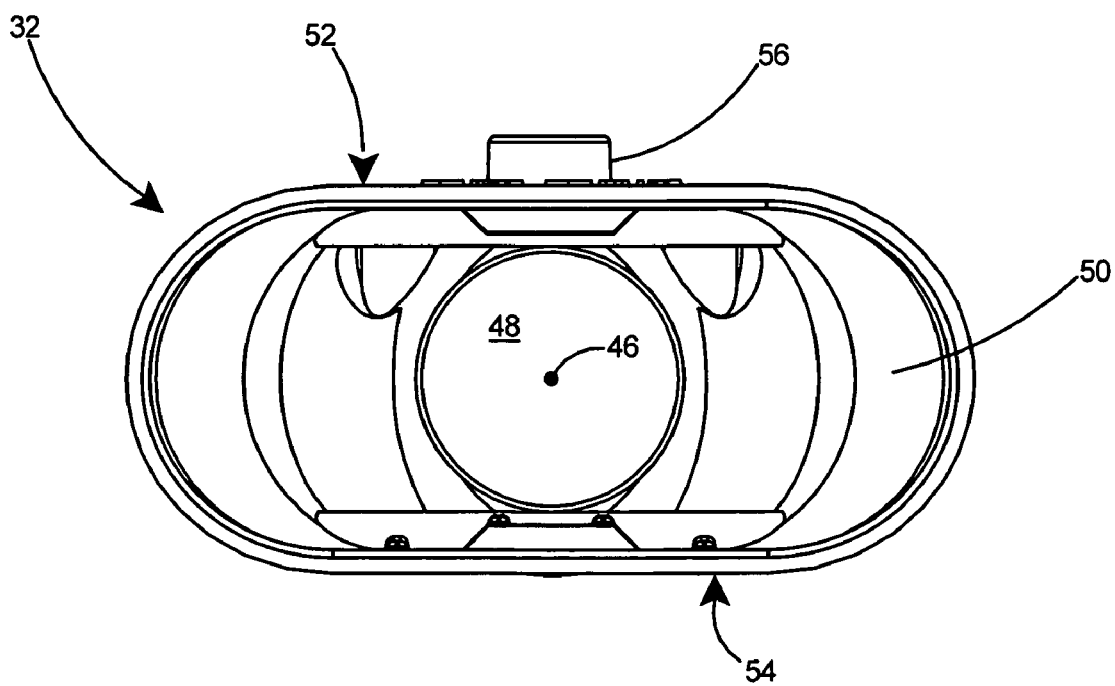
FIG. 2 is an end view of the connector body taken along line 2-2 of FIG. 1.
Figure 3:
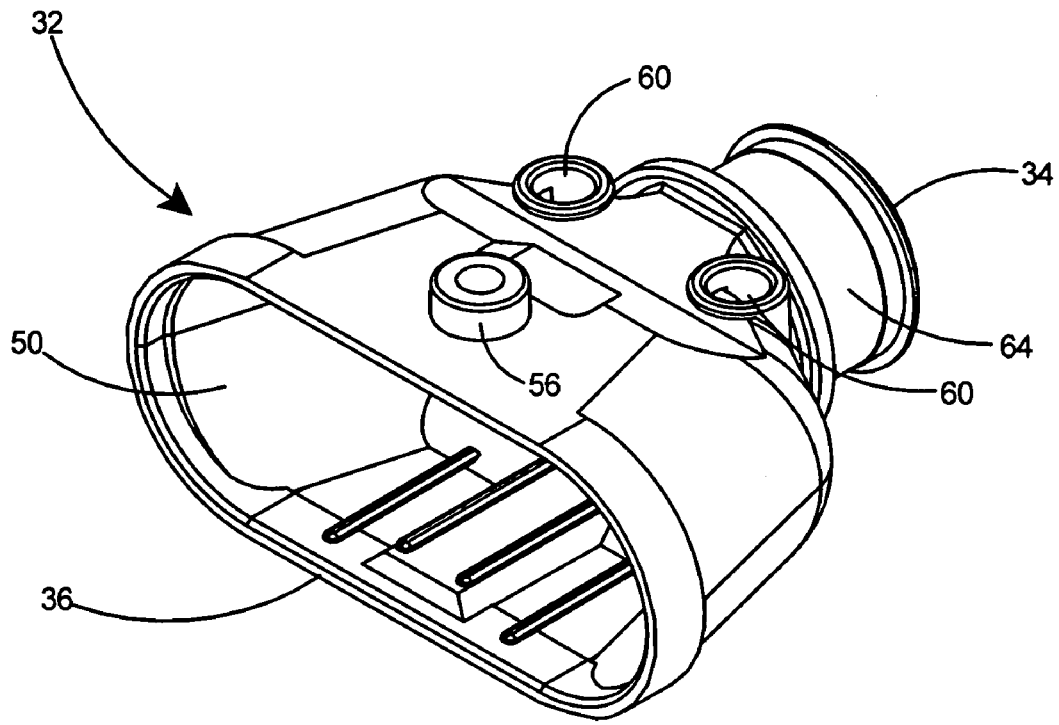
FIG. 3 is a perspective view of the connector body of FIG. 1.
Figure 4:
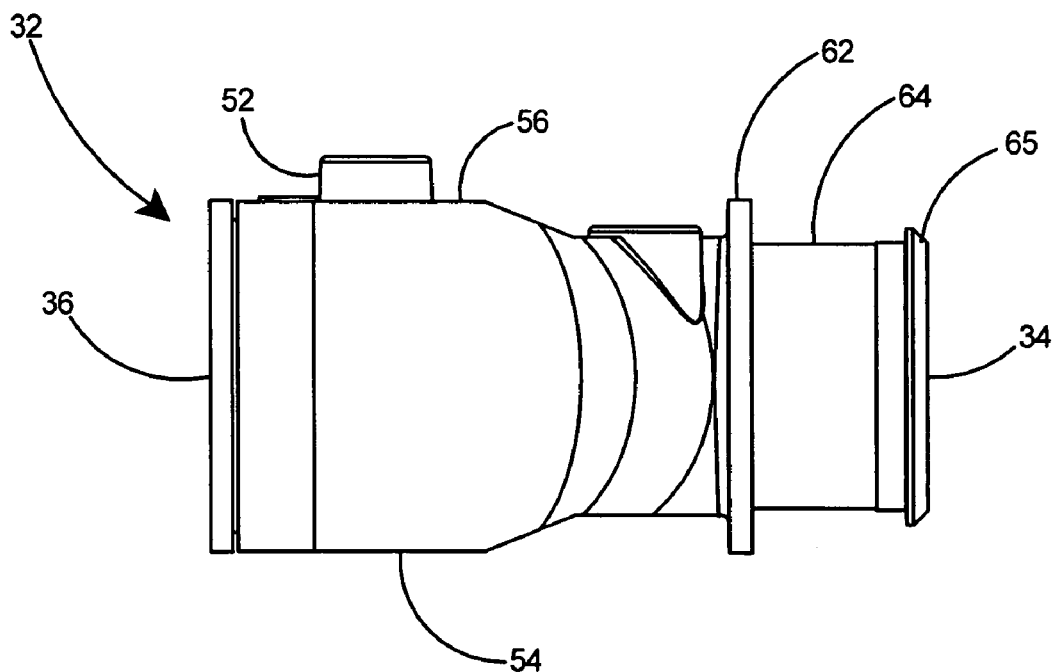
FIG. 4 is a side view of the connector body of FIG. 1.
Figure 5:
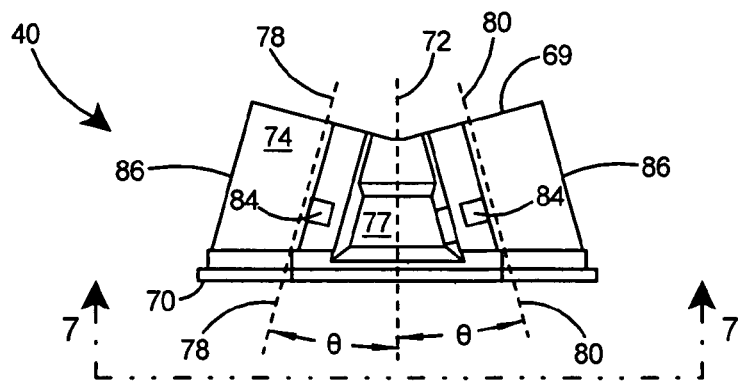
FIG. 5 is a top view of a snap ring holder that forms a portion of the duplex electrical fitting of the present invention.
Figures 6, 7:
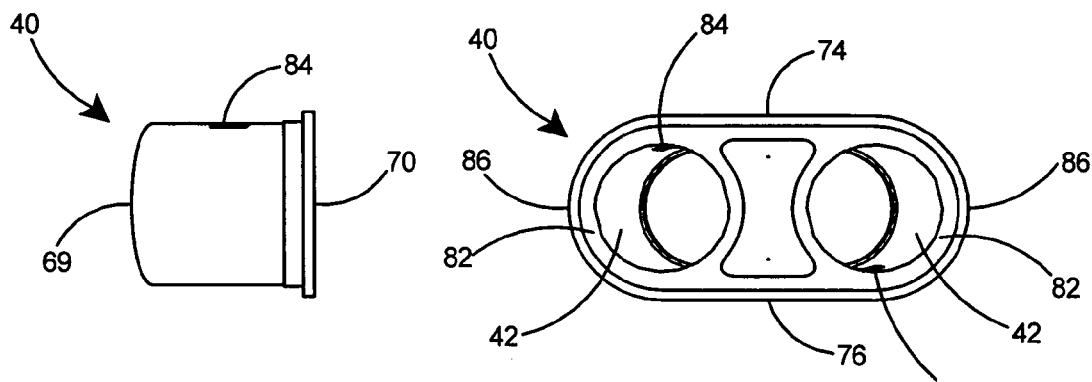
FIG. 6 is a side view of the snap ring holder of FIG. 5.
FIG. 7 is an end view of the snap ring holder taken along line 7-7 of FIG. 5.
Figure 8:
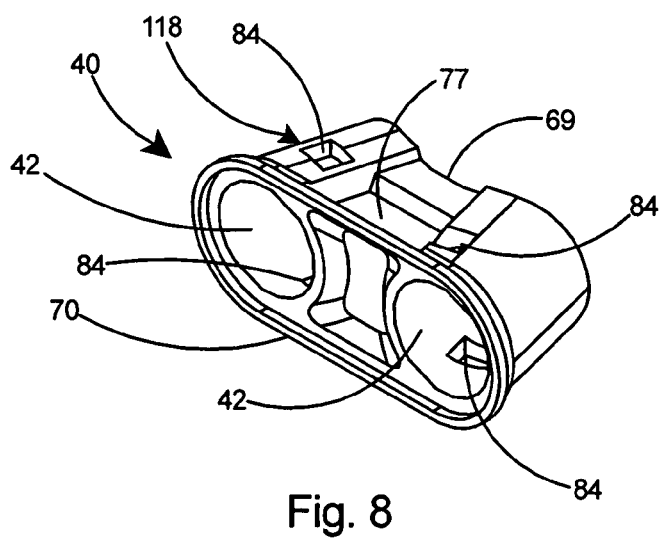
FIG. 8 is a perspective view of the snap ring holder of FIG. 5.

Referring to FIGS. 1 and 2, the connector body 32 includes a center axis 46, a leading opening 48, and a trailing opening 50. The connector body 32 includes a top surface 52 and a bottom surface 54 with a boss 56 including a threaded bore 58 extending upwards from the top surface 52. Two view ports 60 are provided in the top surface 52. The connector body 32 includes an intermediate flange 62, a nose portion 64 extending to the leading end 34, and a leading flange 65. The cylindrical nose portion 64 may have a smooth surface as shown in FIG. 1. The leading end 34 of the duplex electrical fitting 30 can be secured to a panel or an electrical box (not shown) by an attachment arrangement such as the spring steel adapter (14) disclosed in U.S. Pat.

Figure 24:
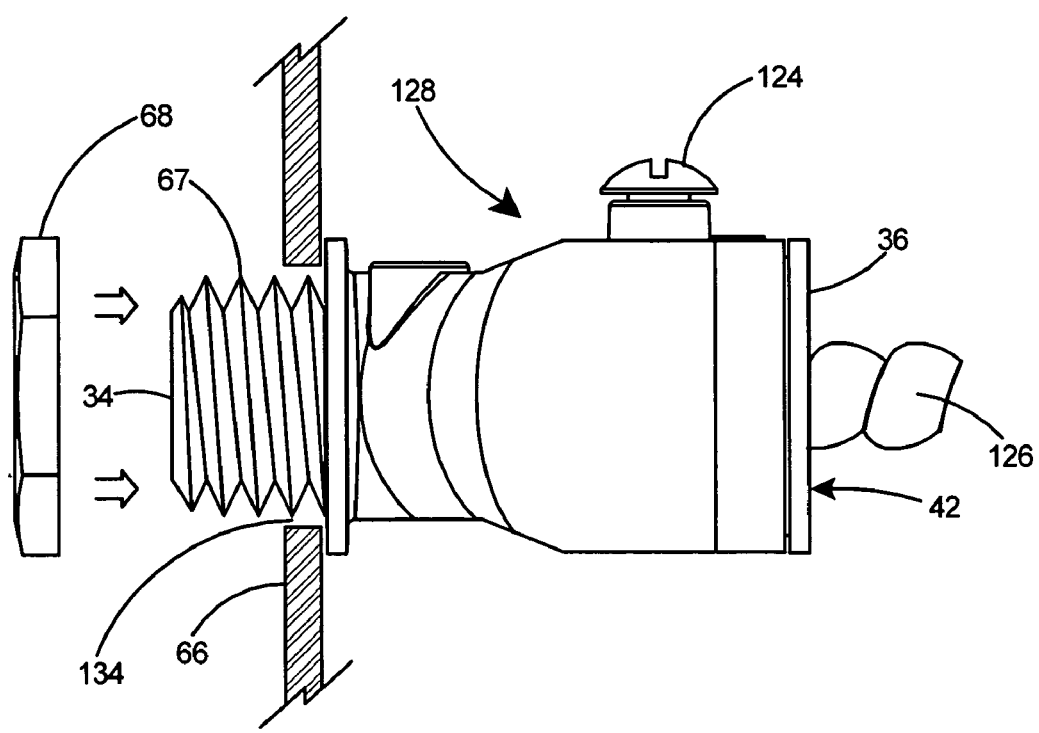
FIG. 24 is a side view of an alternate embodiment of a duplex electrical fitting according to the present invention being inserted into a knockout hole in an electrical panel.

No. 6,335,488 or the spring steel adapter (20) disclosed in U.S. Pat. No. 5,266,050, commonly referred to as snap fittings, both of which patents in their entireties are incorporated herein by reference. Alternatively, in another embodiment as shown in FIG. 24, the leading end 34 of the electrical fitting 30 can be secured to an electrical box or electrical panel 66 by an alternative attachment arrangement consisting of a threaded nose portion 67 on the electrical fitting and a locknut 68.

With reference to FIGS. 5-8, the snap ring holder 40 includes a leading end 69, a trailing end 70, a center axis 72, a top surface 74, a bottom surface 76, and a depression 77 in the top surface 74. The two non-parallel bores 42 include central axes 78 and 80 and are defined by peripheral walls 82. Openings 84 are provided in the peripheral walls 82 as shown. The central axes 78 and 80 of the bores 42 are each at an angle θ of at least 2 degrees with respect to the center axis 72 of the snap ring holder 40. The snap ring holder 40 includes sides 86 that slope inwardly at a constant angle from the trailing end 70 to the leading end 69.

Figure 14:
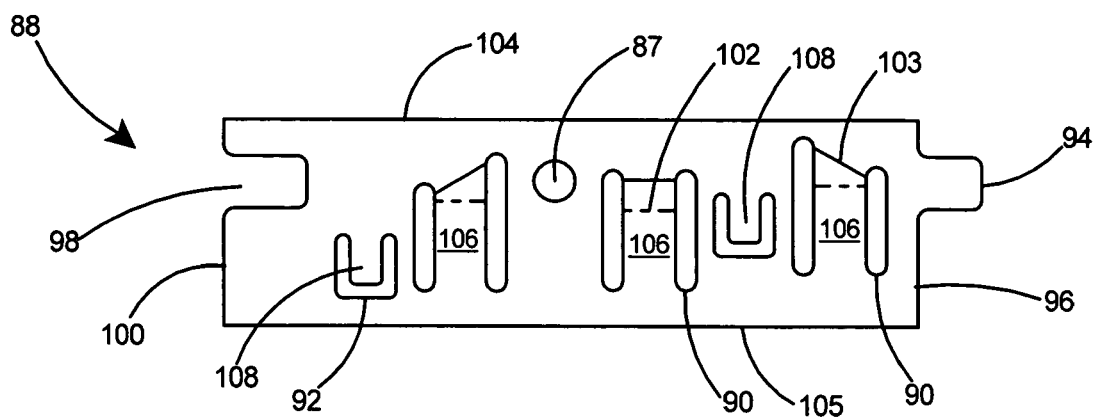
FIG. 14 is a plan view of a blank that will be used to form a snap ring according to the present invention.
Figure 15:
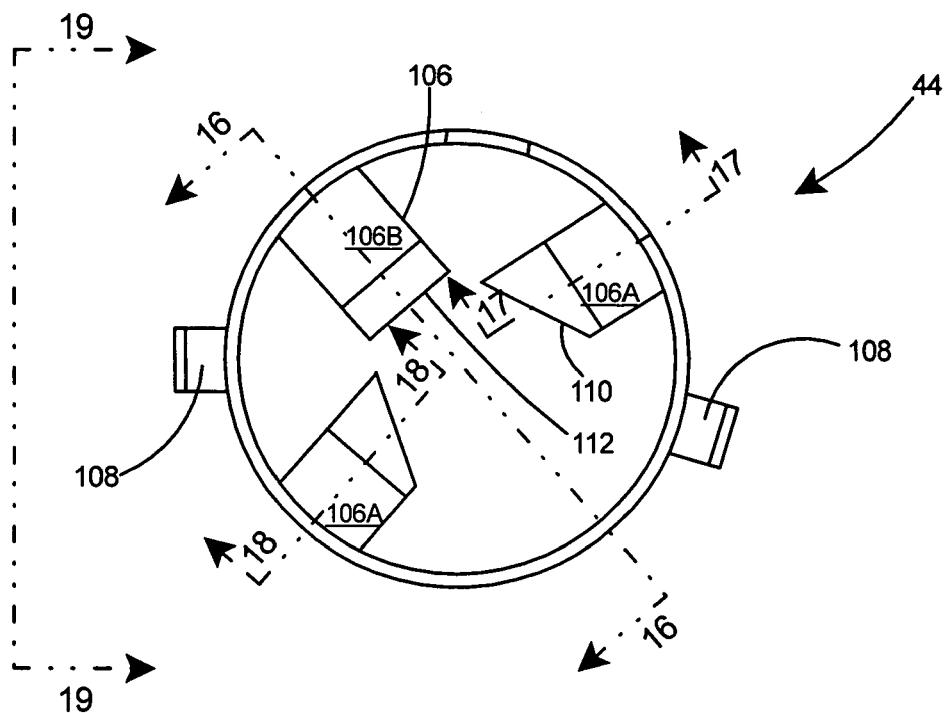
FIG. 15 is a plan view of a snap ring formed from the blank of FIG. 14.
Figure 16:
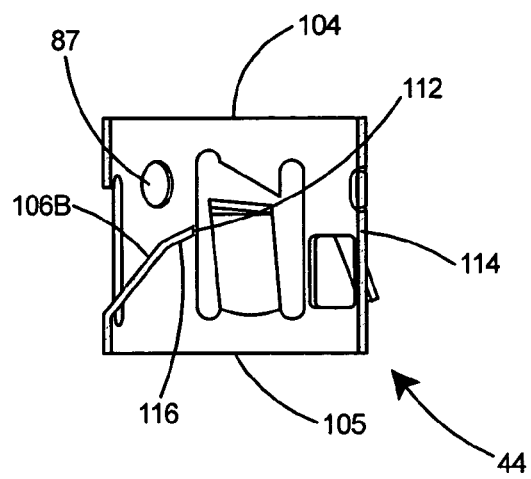
FIG. 16 is a sectional view of the snap ring taken along line 16-16 of FIG. 15.
Figure 17:
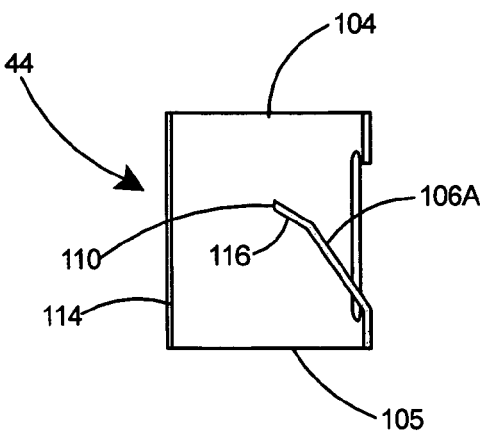
FIG. 17 is a sectional view of the snap ring taken along line 17-17 of FIG. 15.
Figure 18:
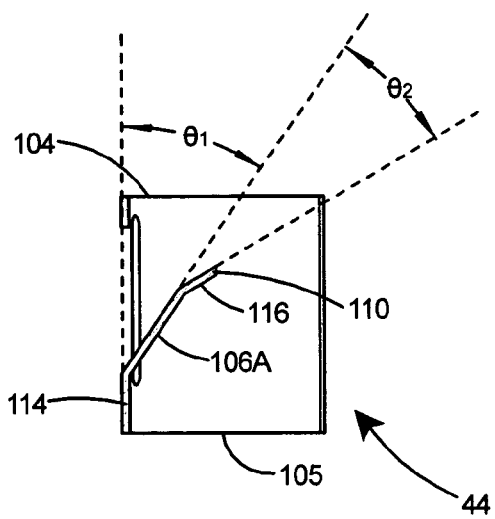
FIG. 18 is a sectional view of the snap ring taken along line 18-18 of FIG. 15.
Figure 19:
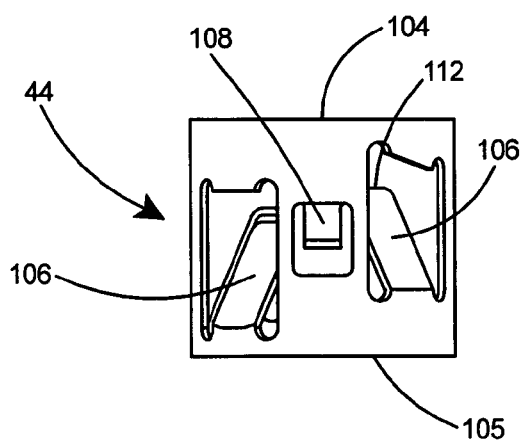
FIG. 19 is a side view of the snap ring taken from line 19-19 of FIG. 15.

With reference to FIGS. 14-15, each snap ring 44 is formed from a flat blank 88 constructed of spring steel. The blank 88 is stamped into a shape as depicted in FIG. 14, with straight slots 90, U-shaped slots 92, a tab 94 at one end 96 of the blank 88, and a complementary groove 98 at the opposite end 100 of the blank. Bend lines 102 are depicted in dashed lines and slit lines 103 are depicted in solid lines on the blank 88. The blank 88 includes a leading edge 104 and a trailing edge 105. Each pair of straight slots 90 along with an associated slit 103 between the slots 90 defines an inward tang 106 and each U-shaped slot 92 defines an outward-directed tang 108. An opening 87 is provided in the blank 88 for centering and locking the blank 88 with respect to a mandrel when bending the blank into the cylindrical shaped snap ring 44.

As shown in FIG. 15, the stamped blank is bent into a split snap ring 44, with inward tangs 106 bent inwards of the ring 44 and the outward-directed tangs 108 bent outwards of the ring 44. The inward tangs include two opposing inward tangs 106A with angled free ends 110 and a pusher tang 106B with a straight free end 112.

As shown in FIGS. 16-19, the inward tangs 106 and the free ends 110 and 112 are directed toward the leading edge 104 of the snap ring 44. The inward tangs 106 are bent at a first angle $\theta_1$ with respect to the sidewall 114 of the snap ring 44 and are bent at a second angle $\theta_2$ with respect to the inward tang 106 at bend line 102 to form end portion 116. The free ends 110 and 112 are directed toward the leading edge 104 of the snap ring 44.

Figure 13:
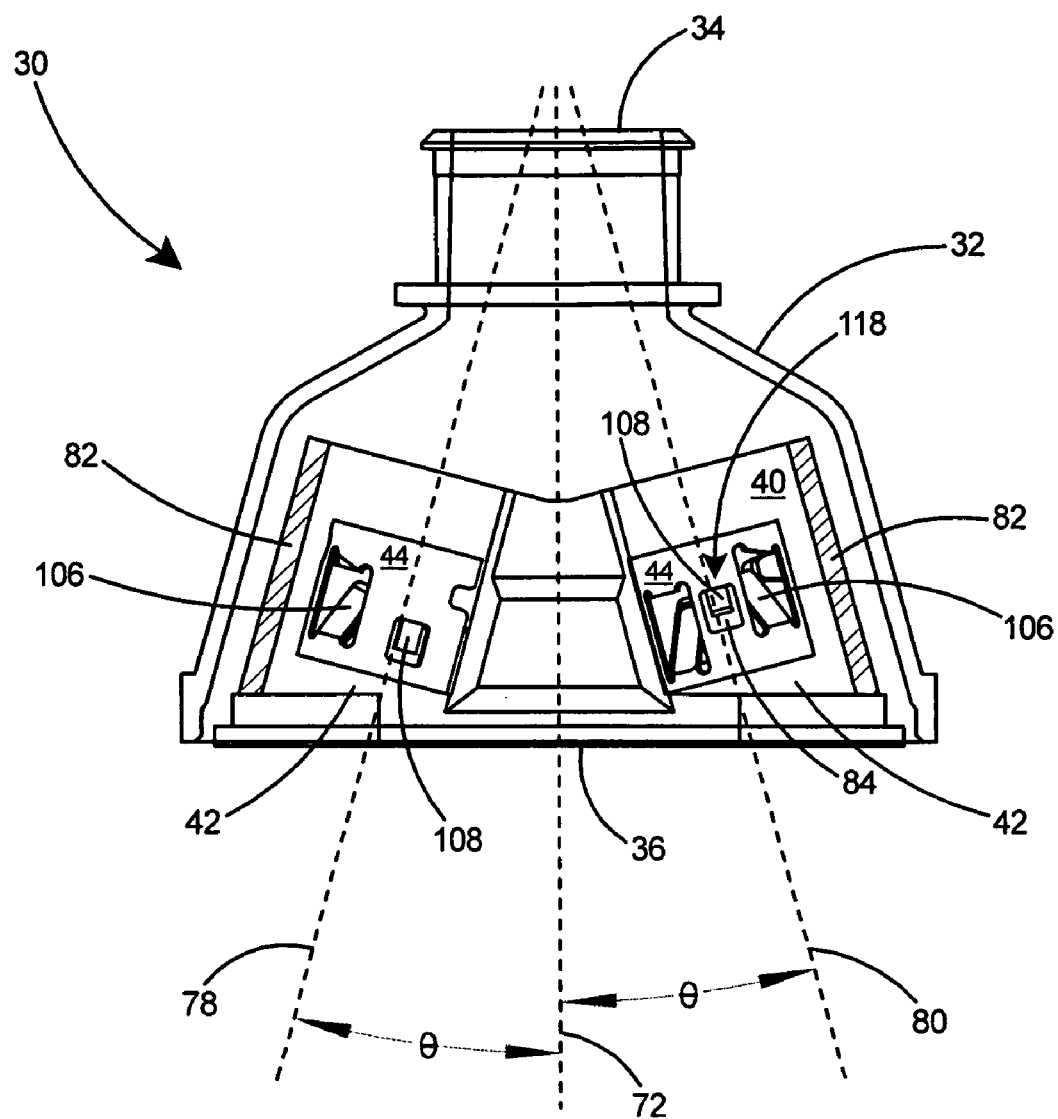
FIG. 13 is a sectional view of the duplex electrical fitting taken along line 13-13 of FIG. 11.

With reference to FIG. 13, an attachment arrangement 118 for securing the snap rings 44 to the snap ring holder 44 includes the openings 84 (see FIG. 5) in the peripheral walls 82 that form the non-parallel bores 42 and the outward-directed tangs 108 of the snap rings 44.

Figure 20:
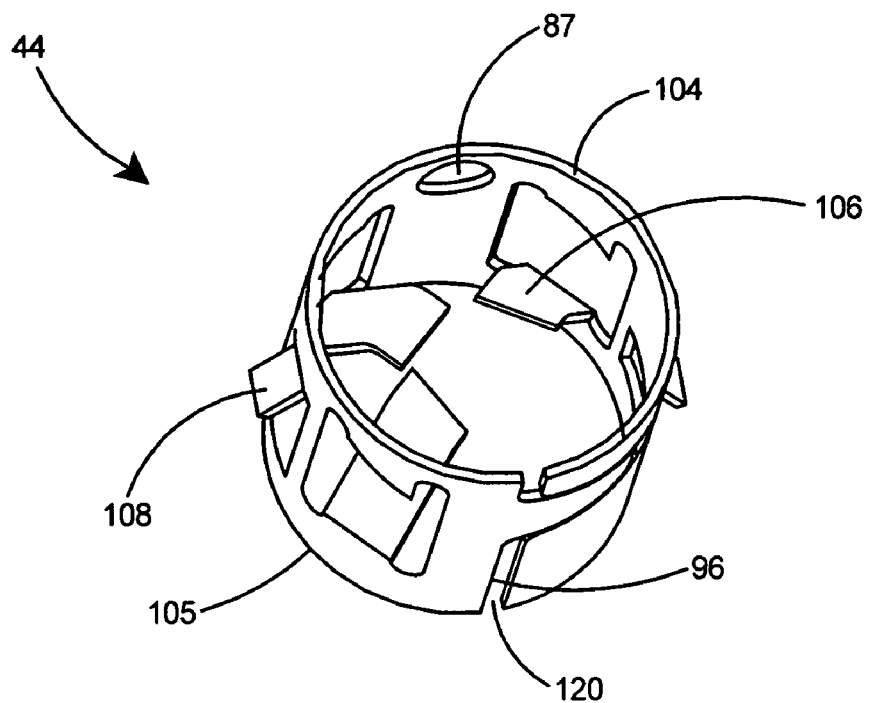
FIG. 20 is a perspective view of the snap ring of FIG. 15.
Figure 21:
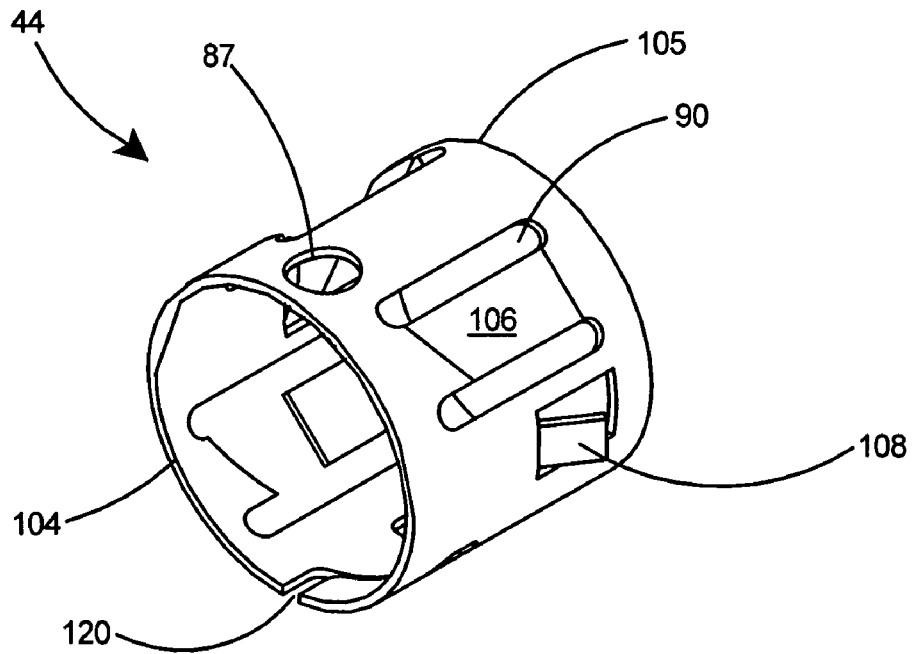
FIG. 21 is a perspective view of the snap ring of FIG. 15.

Referring to FIGS. 20 and 21, the snap rings 44 are split rings constructed of spring steel and are bent into a general cylindrical shape but with a gap 120 between the ends 96 and 100 of the split ring.

Figure 11:
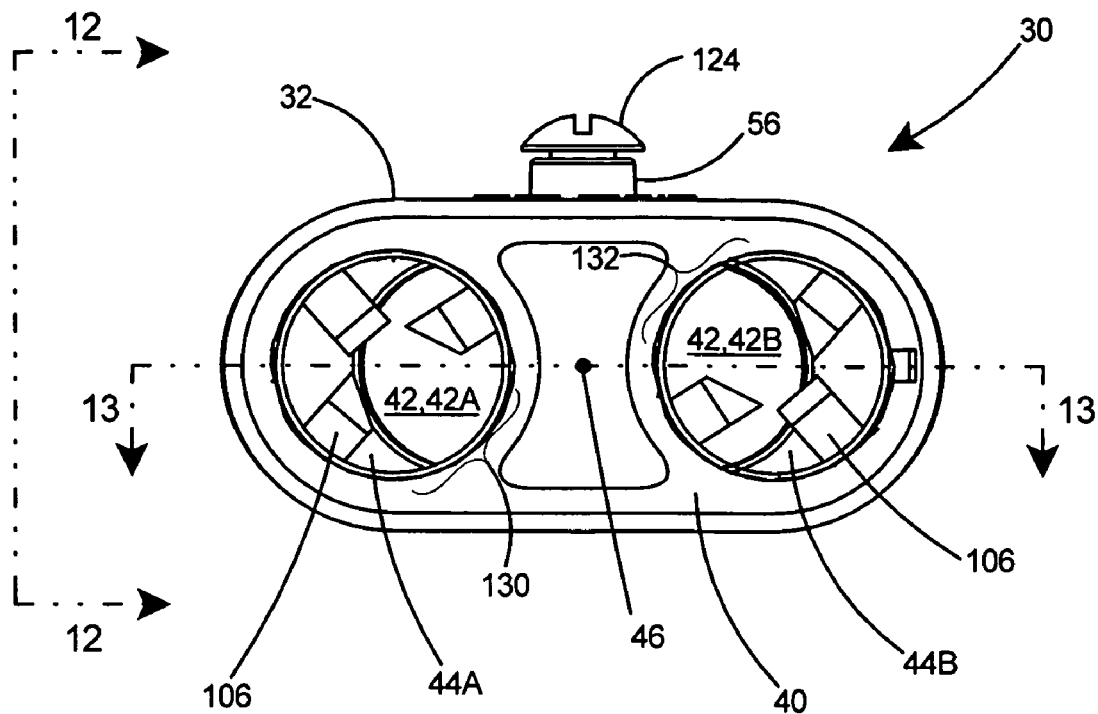
FIG. 11 is an end view of the duplex electrical fitting taken along line 11-11 of FIG. 10.

As shown in FIG. 13, the snap rings 44 can therefore be compressed from their unbiased generally cylindrical shape, inserted into the bores 42 with the outward-directed tangs 108 aligned with the openings 84 in the peripheral walls 82, and released, whereupon the outward-directed tangs 108 snap into the openings 84 and are held within the bores 42 by the strength of the spring steel snap rings 44 relaxing into their unbiased shape. After being snapped into the non-parallel bores 42, as shown in FIG. 11, the snap rings 44 are held securely in the snap ring holder 40.

Figure 12:
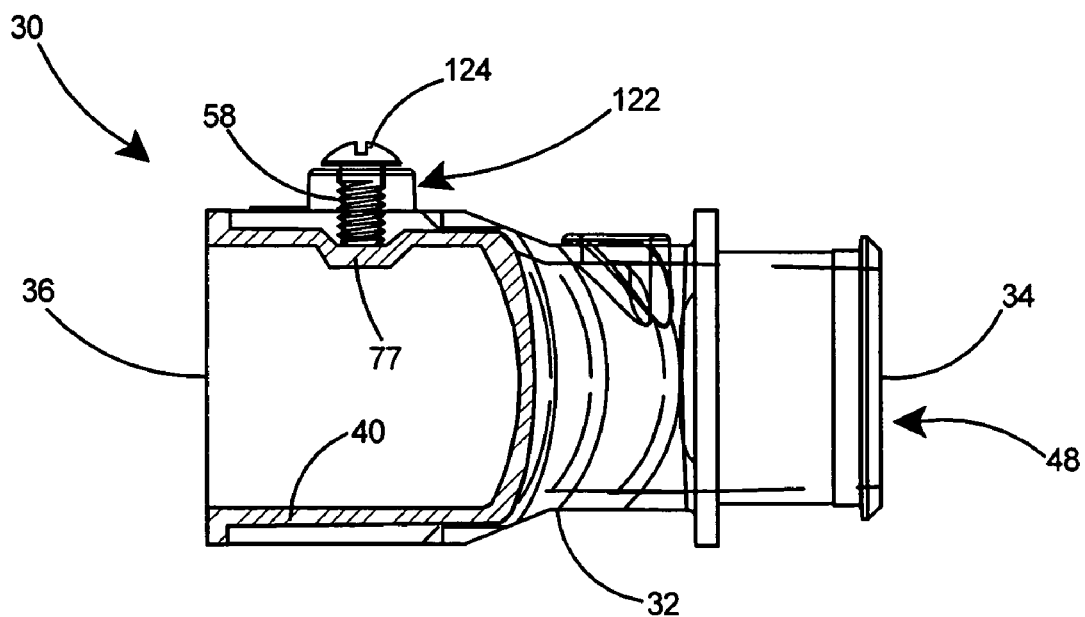
FIG. 12 is a side view of the duplex electrical fitting taken along line 12-12 of FIG. 11.

With reference to FIG. 12, an attachment arrangement 122 is shown for securing the snap ring holder 40 to the connector body 32. The attachment arrangement 122 includes the depression 77 in the snap ring holder 40 and a fastener 124 in the threaded bore 58. Tightening of the fastener 124 in the threaded bore 58 seats the fastener in the depression 77 of the snap ring holder 40 thereby locking the snap ring holder 40 within the connector body 32.

The duplex electrical fitting 30 of the present invention is provided in one piece as shown in FIG. 13, with the snap rings 44 secured to the snap ring holder 40 and the snap ring holder 40 secured to the connector body 32. The duplex electrical fitting 30 includes non-parallel bores 42 in its trailing end 36. Preferably, the central axes 78 and 80 of the bores 42 are each at an angle θ of at least 2 degrees with respect to the common center axis 72 of both the connector body 32 the electrical fitting 30. More preferably, the central axes 78 and 80 of the bores 42 are each at an angle θ of between 2 and 20 degrees with respect to the center axis 72 of the electrical fitting 30. Most preferably, the central axes 78 and 80 of the bores 42 are each at an angle of 15 degrees with respect to the center axis 72 of the duplex electrical fitting 30.

With reference to a sectional view of the preferred embodiment in FIG. 13, the duplex electrical fitting 30 of the present invention includes two non-parallel bores 42 in the snap ring holder 40, which is secured in the trailing end 36 connector body 32. The non-parallel bores 42 include central axes 78 and 80 with a snap ring 44 secured in each of the bores 42 by one or more outward-directed tangs 108. One or more inward tangs 106 on each of the snap rings 44 are directed toward the leading end 34 of the connector body 32.

Figure 22:
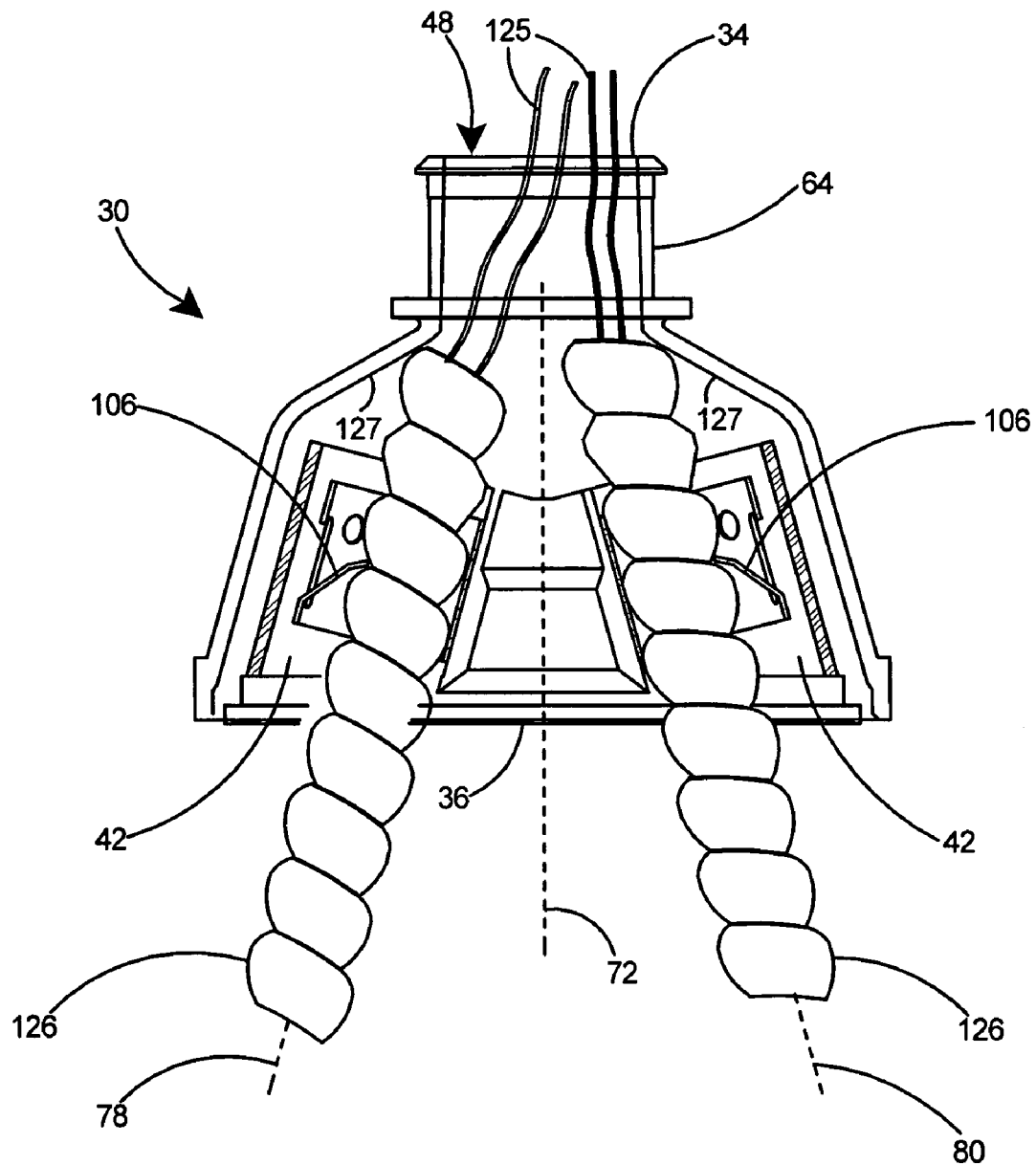
FIG. 22 is a sectional view of the duplex electrical fitting taken along line 13-13 of FIG. 11 and including two electrical cables inserted into the trailing end of the fitting.

With reference to FIG. 22, an electrical cable 126 inserted into each of the non-parallel bores 42 is directed along its respective axis 78 or 80 and is locked into the electrical fitting by the inward tangs 106 in the trailing end 36 of the electrical fitting 30. Although FIG. 22 depicts electrical cables 126 having a helically wound outer sheath, duplex fitting 30 can also accommodate non-helical cables such as flexible electrical cable. One distinct advantage provided by the fitting with non-parallel bores 42 of the present invention is the fact that the non-parallel bores 42 align the cables 126 with the leading opening 48 of the fitting 30, and prevent the cables 126 and the wire leads 125 from crashing into the inner shoulders 127 of the fitting. Prior art fittings with parallel bores typically run the cables directly into the inner shoulders and make it difficult to feed the wiring through the prior art fitting.

Figure 23:
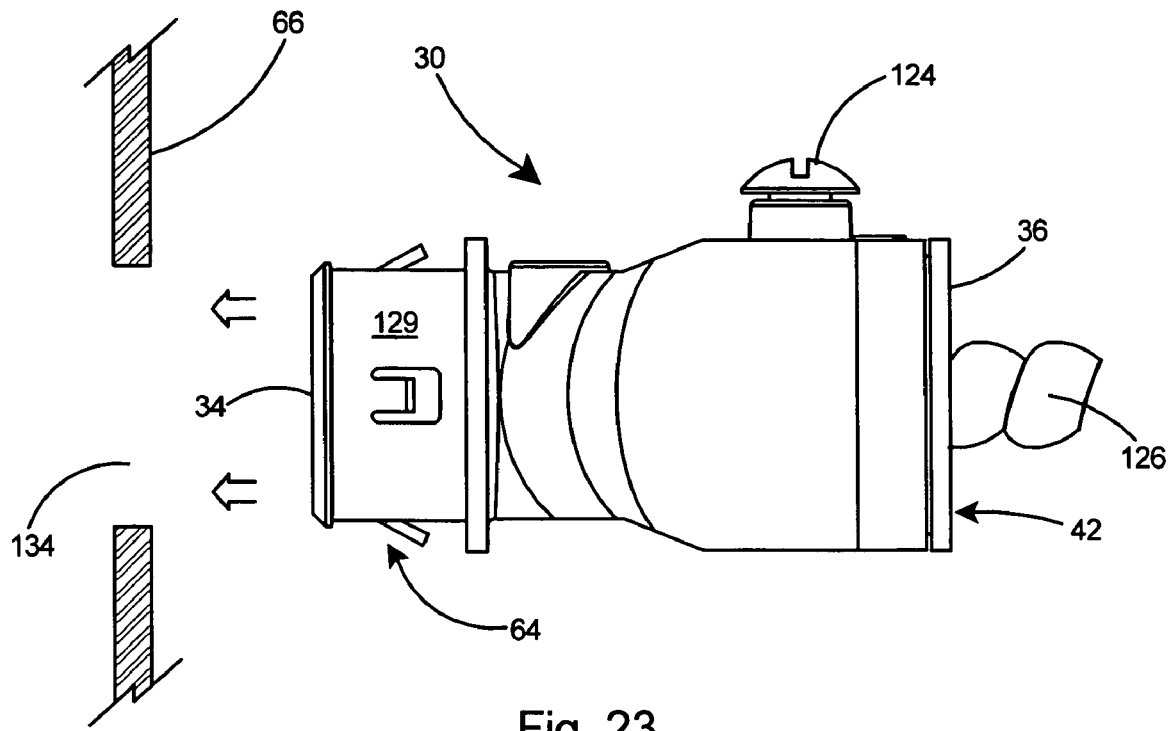
FIG. 23 is a side view of the duplex electrical fitting of FIG. 9 being inserted into a knockout hole in an electrical panel.

Referring to FIGS. 23 and 24, either before or after inserting electrical cables in the trailing end 36, the leading end 34 of the duplex fitting 30 is secured to an electrical box or panel 66 as shown in FIGS. 23 and 24. FIG. 23 depicts a duplex fitting 30 according to the present invention with a leading end snap ring 129 on the nose portion 64 of the fitting. FIG. 24 depicts a duplex fitting 128 with a threaded nose portion 67 and a locknut 68 for securing the leading end 34 of the electrical fitting 128 to the panel 66.

With reference to the preferred embodiment in FIG. 11, each of the snap rings 44 includes three of the inward tangs 106 for directing an electrical cable (not shown) toward the center axis 46 of the connector body 32. The snap rings 44 include a first snap ring 44A and a second snap ring 44B. The bores 42 include a first bore 42A and a second bore 42B. The first snap ring 44A secured in the first bore 42A directs an electrical cable to the lower inner quadrant 130 of the first bore 42A and the second snap ring 44B secured in the second bore 42B directs an electrical cable to the upper inner quadrant 132 of the second bore 42B. The snap rings 44 and non-parallel bores 42 of the present invention therefore direct the inserted electrical cables inwardly toward the outlet or leading opening 48 (see FIG. 12) of the duplex fitting 30. Furthermore, the number and arrangement of the inward tangs 106 direct one electrical cable downward and a second electrical cable upwards to promote cable separation within the fitting and therefore enable easier insertion of cables through the fitting.

The duplex electrical fitting 30 described herein is provided in one piece. An installer can operate the present invention by simply pushing the leading end 34, as shown in FIG. 23, through a knockout hole 134 whereupon the leading end 34 of the fitting 30 will snap lock into the panel 66.

Alternatively, as shown in FIG. 24, an installer can push the leading end 34 through a knockout hole 134 and tighten a locknut 68 onto the threaded nose portion 67 of the duplex fitting 128. With reference to FIGS. 23 and 24, after the fittings 30 and 128 are locked to the panel 66, the installer simply pushes an electrical cable (not shown) into each of the non-parallel bores 42 at the trailing end 36 of the fitting to complete the installation.

The connector body 32 and snap ring holder 40 of the present invention are each preferably constructed of metal. The connector body 32 is constructed of a conductive metal such as steel, zinc, galvanized steel, or aluminum. The connector body 32 of the present invention is typically formed by die-casting and die-casting alloys are the most preferred material of construction. A most preferred material of construction for the tubular body is Zamak™, a casting alloy comprised mainly of zinc alloyed with aluminum, magnesium, and copper and available from Eastern Alloys, Maybrook, N.Y. By constructing the tubular body of Zamak™ or other appropriate metals, the tubular body will be electrically conductive and provide good continuity throughout the fitting.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. An electrical fitting for connecting electrical cables to a hole in a panel or electrical box comprising:
    a connector body including a leading end, a trailing end, a center axis, and a leading opening;
    two non-parallel bores in said trailing end of said connector body, said bores including central axes;
    a tubular ring in each of said bores of said connector body;
    an attachment arrangement for securing said tubular rings to said connector body;
    an inward tang on each of said tubular rings; and
    said inward tang directed toward said leading end of said connector body for locking the electrical cables to said connector body.

2. The electrical fitting of claim 1 wherein said central axes of said bores are each at an angle of at least 2 degrees with respect to said center axis of said connector body.

3. The electrical fitting of claim 1 wherein said central axes of said bores are each at an angle of between 2 and 20 degrees with respect to said center axis of said connector body.

4. The electrical fitting of claim 1 wherein said central axes of said bores are each at an angle of 15 degrees with respect to said center axis of said connector body.

5. The electrical fitting of claim 1 wherein
    said inward tang on said tubular ring includes a free end; and
    said free end of said inward tang is directed toward said leading end of said connector body.

6. The electrical fitting of claim 1 wherein
    said attachment arrangement includes a tubular ring holder in said trailing end of said connector body;
    said tubular ring holder includes said non-parallel bores and peripheral walls defining said bores;
    said peripheral walls of said tubular ring holder including openings therein; and
    said tubular rings including an outward-directed tang.

7. The electrical fitting of claim 6 wherein said attachment arrangement for securing said tubular ring to said connector body includes said outward-directed tang of said tubular ring extending through said openings in said peripheral walls of said tubular ring holder.

8. The electrical fitting of claim 6 wherein
    said electrical fitting includes a third attachment arrangement for securing said tubular ring holder to said connector body;
    said third attachment arrangement includes a depression in said tubular ring holder;
    a threaded bore in said connector body; and
    a fastener in said threaded bore, whereby tightening of said fastener in said threaded bore seats said fastener in said depression of said tubular ring holder thereby locking said tubular ring holder within said connector body.

9. The electrical fitting of claim 8 wherein
    said tubular ring holder and said connector body are constructed of metal; and
    said tubular ring is a split ring constructed of spring steel.

10. The electrical fitting of claim 1 including a second attachment arrangement for securing said leading end of said connector body to the panel or electrical box.

11. The electrical fitting of claim 10 wherein said second attachment arrangement includes
    a threaded nose portion on said leading end of said connector body; and
    a lock nut for engaging said threaded nose portion.

12. The electrical fitting of claim 10 wherein said second attachment arrangement includes
    a nose portion on said leading end of said connector body; and
    a snap fitting on said nose portion.

13. The electrical fitting of claim 1 wherein
    each of said tubular rings includes three of said inward tangs for directing the electrical cables toward said center axis of said connector body;
    said tubular rings include a first tubular ring and a second tubular ring;
    said bores include a first bore and a second bore;
    said first tubular ring secured in said bore directs one of the electrical cables to a lower inner quadrant of said first bore; and
    said second tubular ring secured in said second bore directs a second of the electrical cables to an upper inner quadrant of said second bore.

14. An electrical fitting for connecting electrical cables to a hole in a panel or electrical box comprising:
- a connector body including a leading end, a trailing end, a center axis, a leading opening, and a trailing opening;
- a tubular ring holder secured in said trailing opening of said connector body;
- two non-parallel bores in said tubular ring holder, said bores including central axes;
- a tubular ring in each of said bores;
- an inward tang on each of said tubular rings;
- said inward tang directed toward said leading end of said connector body for locking the electrical cables to said connector body; and
- an attachment arrangement for securing said leading end of said connector body to the panel or electrical box.

15. The electrical fitting of claim 14 wherein said central axes of said bores are each at an angle of at least 2 degrees with respect to said center axis of said connector body.

16. The electrical fitting of claim 15 including one or more outward-directed tang on each of said tubular rings extending through one of said openings in said peripheral walls of said tubular ring holder thereby securing said tubular rings within said non-parallel bores of said tubular ring holder.

17. The electrical fitting of claim 14 wherein
- said tubular ring holder includes peripheral walls defining said non-parallel bores;
- said peripheral walls of said tubular ring holder including openings therein; and
- said tubular rings each include an outward-directed tang.

18. The electrical fitting of claim 14 wherein said attachment arrangement includes
- a threaded nose portion on said leading end of said connector body; and
- a lock nut for engaging said threaded nose portion.

19. The electrical fitting of claim 14 wherein said attachment arrangement includes
- a nose portion on said leading end of said connector body; and
- a snap fitting on said nose portion.

* * * * *